United States Patent
Lu et al.

(10) Patent No.: US 12,007,821 B2
(45) Date of Patent: Jun. 11, 2024

(54) POWER LOSS PREVENTION CIRCUIT WITH MITIGATION FOR FAILED ENERGY STORAGE BANKS

(71) Applicant: MONOLITHIC POWER SYSTEMS, INC., San Jose, CA (US)

(72) Inventors: Ming Lu, San Jose, CA (US); Pengjie Lai, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 181 days.

(21) Appl. No.: 17/716,924

(22) Filed: Apr. 8, 2022

(65) Prior Publication Data

US 2023/0324970 A1    Oct. 12, 2023

(51) Int. Cl.
    *G06F 1/30*    (2006.01)
(52) U.S. Cl.
    CPC ..................... *G06F 1/30* (2013.01)
(58) Field of Classification Search
    CPC .......................................................... G06F 1/30
    See application file for complete search history.

(56) References Cited

U.S. PATENT DOCUMENTS

| | | | | |
|---|---|---|---|---|
| 9,106,103 | B2* | 8/2015 | Paulakonis | H02J 9/062 |
| 9,998,009 | B1* | 6/2018 | Lai | H02M 3/157 |
| 10,283,173 | B2* | 5/2019 | Narayanan | G11C 16/30 |
| 2010/0008175 | A1* | 1/2010 | Sweere | G11C 11/005 |
| | | | | 365/228 |
| 2011/0185211 | A1* | 7/2011 | Chiasson | G06F 1/3287 |
| | | | | 714/48 |
| 2013/0169258 | A1* | 7/2013 | Lai | H02M 3/1582 |
| | | | | 323/311 |
| 2014/0246906 | A1* | 9/2014 | Wang | G06F 1/00 |
| | | | | 307/23 |
| 2015/0268709 | A1* | 9/2015 | Morning-Smith | H02J 7/345 |
| | | | | 307/64 |
| 2016/0246345 | A1* | 8/2016 | Johnston | G06F 1/26 |
| 2018/0032120 | A1* | 2/2018 | Maheswaran | G06F 1/30 |
| 2018/0032390 | A1* | 2/2018 | Rahmanian | G06F 11/0754 |
| 2018/0059761 | A1* | 3/2018 | An | G06F 13/4068 |
| 2018/0276092 | A1* | 9/2018 | Nelson | G06F 11/1441 |
| 2018/0308527 | A1* | 10/2018 | Narayanan | G06F 3/0619 |
| 2021/0034128 | A1* | 2/2021 | Suljic | G06F 1/263 |
| 2021/0141433 | A1* | 5/2021 | Watt | G06F 11/1076 |

(Continued)

OTHER PUBLICATIONS

"Wide Input 2.7—18V, 5A, High-Efficiency Bidirectional, Power Back-Up Manager with Integrated Hot-Swap, I2C, ADC, and Cap Health Test" MP5515 Rev. 1.02, pp. 1-40, Jan. 18, 2018.

*Primary Examiner* — Aurel Prifti
(74) *Attorney, Agent, or Firm* — Beyer Law Group LLP (57) ABSTRACT

A power management integrated circuit (PMIC) chip provides power loss protection to an application device. The PMIC chip has several storage pins that each receives a set of storage capacitors that are charged using power from a power source during normal operation. An application device receives power from the power source during normal operation and receives power from an operational set of storage capacitors during power loss. A failing set of storage capacitors is disconnected from an operational set of storage capacitors and from the PMIC chip. The operational set of storage capacitors remains connected to the PMIC chip to provide power loss protection.

16 Claims, 4 Drawing Sheets

(56) References Cited

U.S. PATENT DOCUMENTS

| | | | |
|---|---|---|---|
| 2021/0234376 A1* | 7/2021 | Jain | G06F 1/28 |
| 2022/0321060 A1* | 10/2022 | Hsu | H03F 3/245 |
| 2023/0091384 A1* | 3/2023 | Tan | G06F 1/30 |
| | | | 365/226 |

* cited by examiner

POWER LOSS PREVENTION CIRCUIT WITH MITIGATION FOR FAILED ENERGY STORAGE BANKS

TECHNICAL FIELD

The present disclosure is directed to electrical circuits, and more particularly but not exclusively to power loss prevention circuits and associated integrated circuit (IC) devices.

BACKGROUND

Power loss prevention (PLP) circuits are employed in applications where maintaining power to an application device is critical, such as in power backup systems, non-volatile Dual In-Line Memory Modules (NVDIMMs), solid state drives, hard disk drives, etc. A power management integrated circuit (PMIC) with PLP functionality, such as the MP5515 PMIC commercially-available from Monolithic Power Systems, Inc., has a single storage pin for connecting a set of storage capacitors, an input pin for receiving an input voltage from a power source, and an output pin for providing a bus voltage. The application device is powered by the bus voltage.

During normal operation, the PMIC provides power to the application device by connecting the power source at the input pin to the application device at the output pin. The PMIC also charges the storage capacitors during normal operation using power provided by the power source. In the event of power loss, the PMIC disconnects the power source and switches the storage capacitors to the output pin to provide the bus voltage. When a storage capacitor fails, a blocking transistor (e.g., metal-oxide semiconductor field-effect transistor (MOSFET)) is turned OFF to disconnect all of the storage capacitors from the PMIC, thereby preventing the resulting large inrush current from triggering over current protection and losing the bus voltage. This allows the PMIC to continue to provide the bus voltage from the power source even when a storage capacitor fails, albeit with no power loss protection.

BRIEF SUMMARY

In one embodiment, an integrated circuit (IC) chip with power loss protection has an input pin that is connected to receive an input voltage from a power source, an output pin that is connected to provide a bus voltage to an application device, and a plurality of storage pins. Each of a plurality of sets of storage capacitors is connected to a separate storage pin of the plurality of storage pins. The IC chip further includes a disconnect circuit, a converter circuit, and a plurality of blocking circuits. The disconnect circuit connects the power source to the application device during normal operation when the power source provides the input voltage and disconnects the power source from the input pin in an event of power loss when the power source no longer provides the input voltage. The converter circuit charges the plurality of sets of storage capacitors during the normal operation and provides the bus voltage from energy stored in at least one operational set of storage capacitors of the plurality of sets of storage capacitors in the event of power loss. Each blocking circuit of the plurality of blocking circuits connects a corresponding set of storage capacitors to the converter circuit while the corresponding set of storage capacitors remains operational and disconnects the corresponding set of storage capacitors from the converter circuit in an event of a failure of the corresponding set of storage capacitors.

In another embodiment, a method of providing power loss protection to an application device includes monitoring power provided by a power source. While power is being provided by the power source, a plurality of sets of storage capacitors are charged and the power source is coupled to the application device. Each of the plurality of sets of storage capacitors is monitored. In response to detecting a failed set of storage capacitors, the failed set of storage capacitors is disconnected from an operational set of storage capacitors. In response to detecting loss of the power provided by the power source, power to the application device is provided using energy stored in the operational set of storage capacitors.

In yet another embodiment, a circuit for providing power loss protection comprises a converter circuit, a first blocking circuit, and a second blocking circuit. The converter circuit is configured to charge at least a first set of storage capacitors and a second set of storage capacitors during a normal operation when a power source provides an input voltage, and to provide a bus voltage to an application device from energy stored in at least one of the first and second sets of storage capacitors that remains operational during a power loss event when the power source stops providing the input voltage. The first blocking circuit is configured to connect the first set of storage capacitors to the converter circuit while the first set of storage capacitors remains operational and to disconnect the first set of storage capacitors from the converter circuit when the first set of storage capacitors suffers a failure. The second blocking circuit is configured to connect the second set of storage capacitors to the converter circuit while the second set of storage capacitors is operational and to disconnect the second set of storage capacitors from the converter circuit when the second set of storage capacitors suffers a failure.

These and other features of the present disclosure will be readily apparent to persons of ordinary skill in the art upon reading the entirety of this disclosure, which includes the accompanying drawings and claims.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
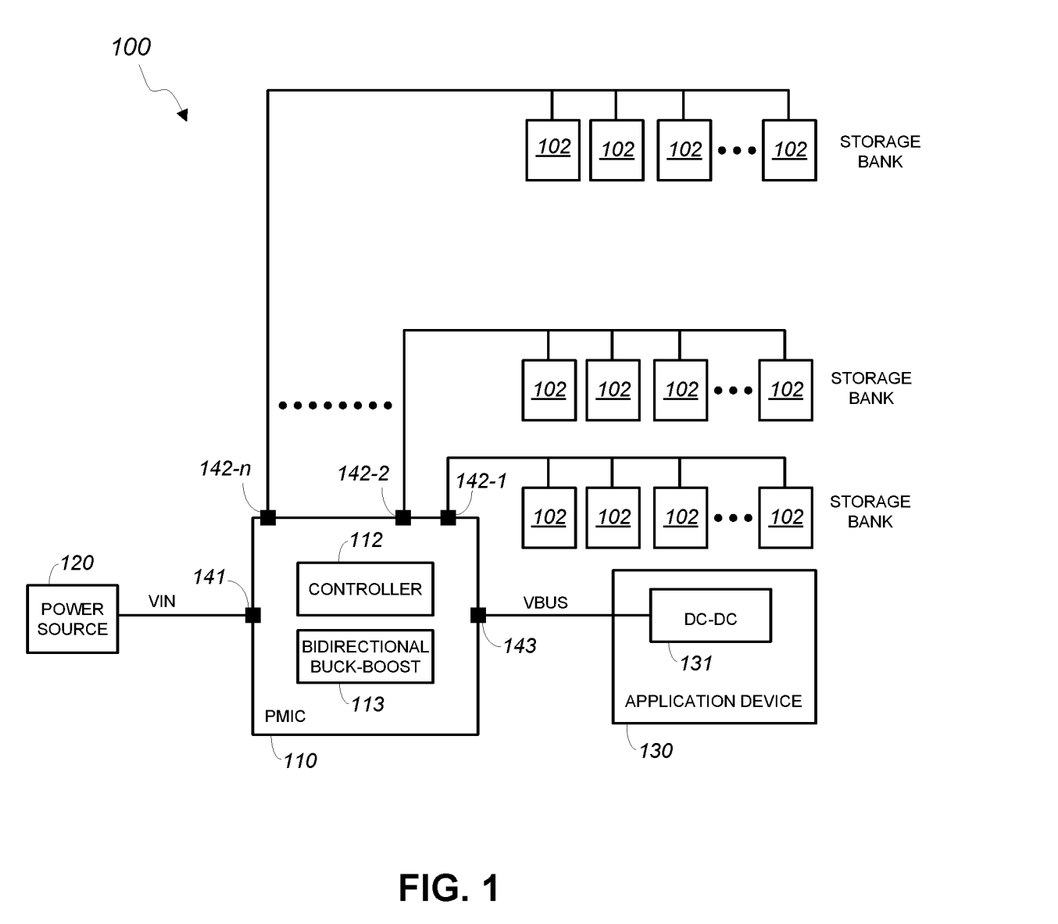
FIG. 1 shows a block diagram of a system with power loss protection in accordance with an embodiment of the present invention.

FIG. 1 shows a block diagram of a system 100 with power loss protection in accordance with an embodiment of the present invention. In the example of FIG. 1, the system 100 includes a power source 120, a power management integrated circuit (PMIC) 110, and an application device 130.

The power source 120 may comprise a power supply or other circuit for providing power to another circuit. In the example of FIG. 1, the power source 120 provides power in the form of an input voltage VIN, which is a DC voltage.

The application device 130 may comprise a power backup system, a non-volatile Dual In-Line Memory Module (NVDIMM), a solid state drive, a hard disk drive, or other device that benefits from power loss protection. For example, the application device 130 may include a volatile memory (e.g., random access memory (RAM)) having contents that need to be saved to a non-volatile memory (e.g., NVRAM) in the event of power loss. The application device 130 may include a DC-DC converter circuit 131, which is configured to generate and maintain a regulated output voltage from a bus voltage VBUS provided by the PMIC 110. The regulated output voltage of the DC-DC converter circuit 131 powers the circuits of the application device 130. The PMIC 110 maintains the bus voltage VBUS for a sufficient time in the event of a power loss when the power source 120 ceases to provide the input voltage VIN. As will be more apparent below, in the event of a power loss, the bus voltage VBUS is provided by the PMIC 110 from energy stored in a plurality of sets of storage capacitors 102 instead of from the power source 120.

As its name indicates, the PMIC 110 comprises electrical circuits that are packaged together as an integrated circuit (IC) chip. In the example of FIG. 1, the PMIC 110 includes a plurality of pins that includes an input pin 141, a plurality of storage pins 142 (i.e., 142-1, 142-2, . . . , 142-n), and an output pin 143. Pins that are not relevant to the present disclosure have been omitted in the interest of clarity.

The PMIC 110 receives the input voltage VIN from the power source 120 at the input pin 141. During normal operation, i.e., when the power source 120 provides the input voltage VIN, the PMIC 110 couples the input voltage VIN at the input pin 141 to the output pin 143 as the bus voltage VBUS. The bus voltage VBUS is a DC voltage. The DC-DC converter circuit 131 generates a regulated output voltage using the bus voltage VBUS as an input voltage. The DC-DC converter 131 may be a buck converter that steps down the bus voltage VBUS, a boost converter that steps up the bus voltage VBUS, or some other type of power converter.

Each single storage pin 142 is connected to an energy storage bank, which in one embodiment is a set of storage capacitors 102 that are connected in parallel. The PMIC 110, which has a plurality of storage pins 142, is connected to two or more energy storage banks. That is, the storage pin 142-1 may be connected to a first set of storage capacitors 102, the storage pin 142-2 may be connected to a second set of storage capacitors, etc. The PMIC 110 is configured to have at least two separate sets of storage capacitors 102, with each of the sets of storage capacitors 102 being separately connected to its own storage pin 142. Additional sets of storage capacitors 102, with each set being connected to a separate storage pin 142, may be connected to the PMIC 110 to meet specific application device requirements.

The PMIC 110 includes a power controller 112 and a bidirectional buck-boost converter 113. As its name indicates, the converter 113 is a DC-DC converter the operates as a buck converter in one direction or a boost converter in an opposite direction. During normal operation, the bidirectional buck-boost converter 113 uses the input voltage VIN from the power source 120 to charge the sets of storage capacitors 102 that are connected to the storage pins 142. In one embodiment, during normal operation, the bidirectional buck-boost converter 113 operates as a boost converter to step up the input voltage VIN to a higher voltage for charging the sets of storage capacitors 102. For example, the bidirectional buck-boost converter 113 may boost the input voltage VIN of 12V up to 30V, which is used to charge the sets of storage capacitors 102 during normal operation.

During power loss, the bidirectional buck-boost converter 113 operates as a buck converter that generates the bus voltage VBUS using energy stored in the sets of storage capacitors 102. For example, the bidirectional buck-boost converter 113 may buck the voltage provided by the sets of storage capacitors 102 from about 30V (which decreases as the energy stored in the sets of storage capacitors 102 is depleted) to about 10V, which is provided at the output pin 143 as the bus voltage VBUS. This allows the DC-DC converter circuit 131 to power the circuits of the application device 130 at least for a sufficient time to allow shutdown procedures to complete (e.g., saving to NVRAM) in the event of power loss. The length of time that the bus voltage VBUS can be provided by the PMIC 110 in the event of power loss depends on the energy storage capacity of the sets of storage capacitors 102.

As will be more apparent below, each set of storage capacitors 102 is connected to a separate blocking circuit. This allows a failed set of storage capacitors 102 to be disconnected from the PMIC 110 without impacting operational (i.e., nonfailing) sets of storage capacitors 102. For example, a failed storage capacitor 102 can create a short circuit to ground. By opening a corresponding blocking circuit, the set with the failed storage capacitor can be disconnected from the PMIC 110, and thus from operational sets of storage capacitors 102. This advantageously allows the PMIC 110 to continue to operate and provide some level of power loss protection, using stored energy from operational sets of storage capacitors 102 that are still connected to the PMIC 110, even in the event of a storage capacitor failure.

The PMIC 110 further includes the controller 112 for controlling the operation of the bidirectional buck-boost converter 113, a disconnect circuit, blocking circuits, and other components of the PMIC 110. The controller 112 may be configured to control the bidirectional buck-boost converter 113 by pulse width modulation (PWM) to operate in buck mode or boost mode operation using conventional algorithms. The controller 112 may generate control signals to control switching of transistors, etc. so that the PMIC 110 operates as described herein. The controller 112 may receive sense signals, such as sense currents/voltages to detect overcurrent, power loss, etc. The controller 112 may be configured to process and respond to received sense signals using comparators, state machines, logic circuits, etc. in accordance with conventional algorithms without detracting from the merits of the present invention.

Figure 2:
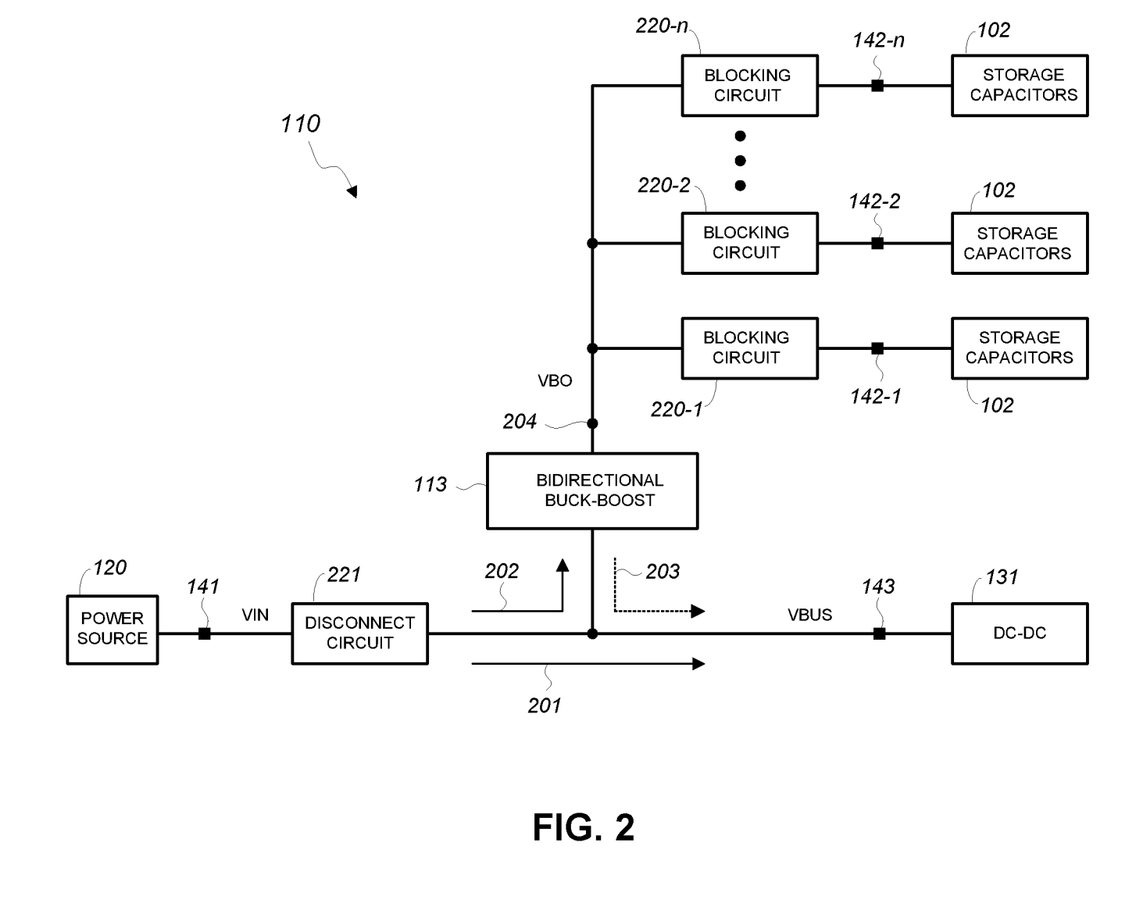
FIG. 2 shows a block diagram of a power management integrated circuit (PMIC) chip in accordance with an embodiment of the present invention.

FIG. 2 shows a block diagram of the PMIC 110 in accordance with an embodiment of the present invention. In the example of FIG. 2, the PMIC 110 includes the bidirectional buck-boost converter 113, a disconnect circuit 221, and a plurality of blocking circuits 220 (i.e., 220-1, 220-2, ..., 220-n). The operation of the aforementioned components of the PMIC 110 as described herein may be controlled by the controller 112 (shown in FIG. 1).

The power source 120 provides the input voltage VIN at the input pin 141 of the PMIC 110. During normal operation, the disconnect circuit 221 is configured to connect the input voltage VIN at the input pin 141 to the output pin 143 as the bus voltage VBUS (see arrow 201), which is received by the DC-DC converter circuit 131 of the application device 130 (shown in FIG. 1). Also during normal operation, the bidirectional buck-boost converter 113 receives the input voltage VIN (see arrow 202) by way of the disconnect circuit 221. The bidirectional buck-boost converter 113 operates as a boost converter during normal operation, using the input voltage VIN from the power source 120 as input voltage to generate, at a storage node 204, a voltage VBO that charges the plurality of sets of storage capacitors 102.

In the event of power loss, the disconnect circuit 221 is configured to disconnect the power source 120 from the PMIC 110, and thus from the DC-DC converter 131. Also during power loss, the bidirectional buck-boost converter 113 operates as a buck converter that uses the voltage VBO at the storage node 204, which is now from the charge stored in the sets of storage capacitors 102, as input voltage to generate the bus voltage VBUS (see arrow 203), which is received by the DC-DC converter circuit 131 at the output pin 143.

Each storage pin 142 of the PMIC 110 has a separate blocking circuit 220 that connects a corresponding set of storage capacitors 102 to the PMIC 110. A blocking circuit 220 is normally in the ON state, i.e., connects a set of storage capacitors 102 to the PMIC 110. In the event of a failure in a set of storage capacitors 102, the corresponding blocking circuit 220 is configured to be in the OFF state, i.e., disconnects the failed set of storage capacitors 102 from the PMIC 110. In the example of FIG. 2, because all of the sets of storage capacitors 102 are connected to the same storage node 204, disconnecting a particular set of storage capacitors 102 from the PMIC 110 also disconnects that particular set of storage capacitors 102 from the other sets of storage capacitors 102.

A set of storage capacitors 102 is deemed to have failed when at least one storage capacitor in the set of storage capacitors 102 has failed, e.g., developed a short to ground. A failed set of storage capacitors 102 may be detected by sensing overcurrent through the line connecting the failed set of storage capacitors 102 to the PMIC 110. Because each set of storage capacitors 102 has a separate connection to the PMIC 110 by way of a separate pin 142, each set of storage capacitors 102 may be monitored for failure and a failed set of storage capacitors 102 may be separately disconnected from the PMIC 110 and from remaining, operational sets of storage capacitors 102. That is, operational sets of storage capacitors 102 will still be connected to the PMIC 110 to provide power loss protection. For example, a failure in the set of storage capacitors 102 connected to the storage pin 142-1 will cause the blocking circuit 220-1 to disconnect the set from the PMIC 110 and from the set of storage capacitors 102 connected to the storage pin 142-2. In that situation, the blocking circuit 220-2 will continue to connect its corresponding set of operational storage capacitors 102 to the PMIC 110.

Figure 3:
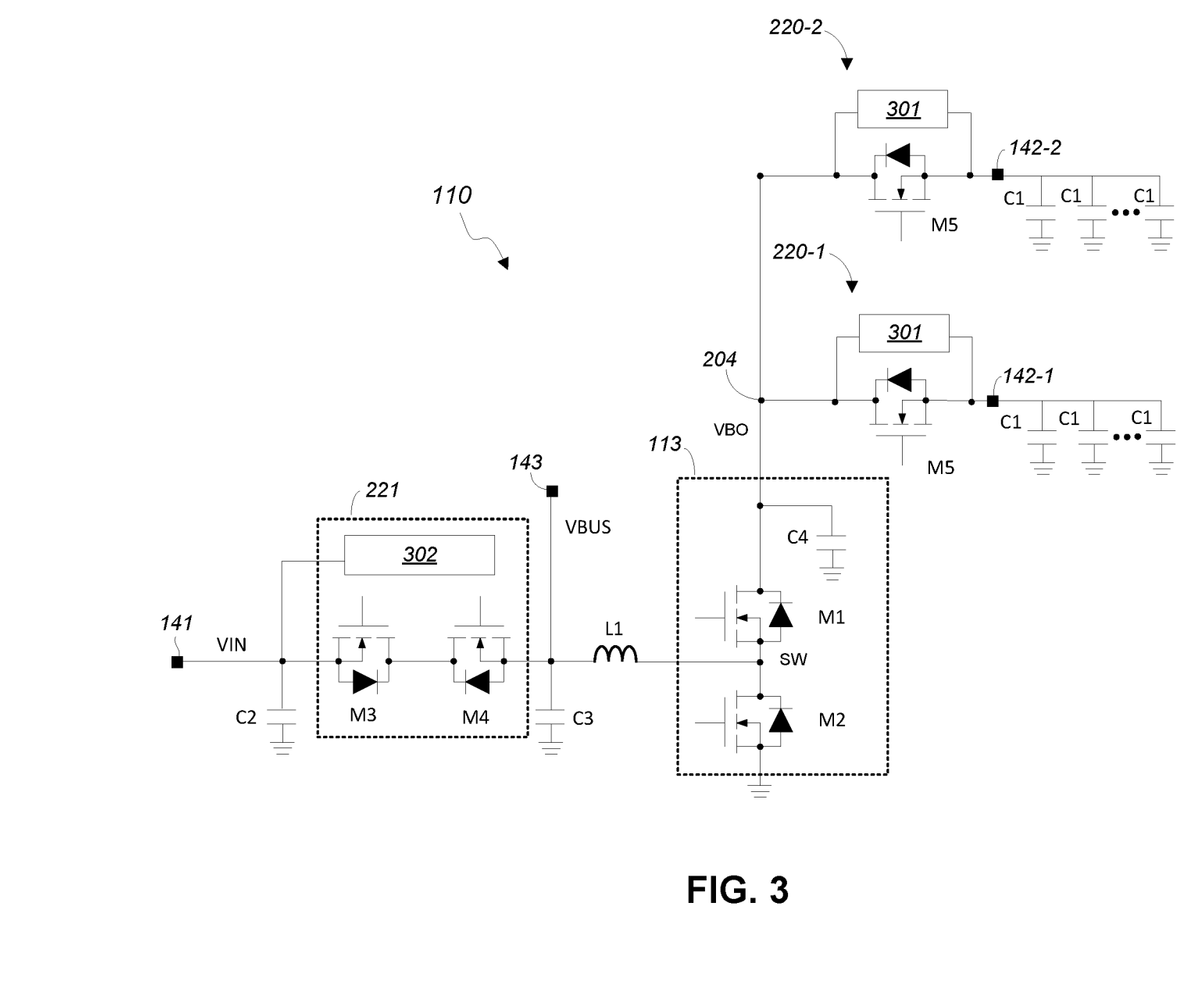
FIG. 3 shows a schematic diagram of the PMIC of FIG. 2 in accordance with an embodiment of the present invention.

FIG. 3 shows a schematic diagram of the PMIC 110 in accordance with an embodiment of the present invention. Only two sets of storage capacitors C1 are shown in FIG. 3 for illustration purposes. The PMIC 110 comprises the disconnect circuit 221, the bidirectional buck-boost converter 113, a blocking circuit 220-1, and a blocking circuit 220-2.

In the example of FIG. 3, a decoupling capacitor C2 connects the input pin 141 to ground, and a capacitor C3 serves as an output capacitor at the output pin 143. The disconnect circuit 221 comprises transistors M3 and M4, which in one embodiment are metal-oxide semiconductor field-effect transistors (MOSFETs). The transistor M3 has a first terminal (e.g., source) that is connected to the input pin 141, and the transistor M4 has a first terminal (e.g., source) that is connected to the output pin 143. A second terminal (e.g., drain) of the transistor M3 is connected to a second terminal (e.g., drain) of the transistor M4. The third terminal (e.g., gate) of each of the transistors M3 and M4 receives a control signal for controlling switching of the transistors M3 and M4. The transistors M3 and M4 are both turned ON to connect the input voltage VIN at the input pin 141 to the output pin 143 as the bus voltage VBUS during normal operation. The transistors M3 and M4 are both turned OFF to disconnect the power source 120 (see FIG. 2) in the event of power loss.

In one embodiment, the disconnect circuit 221 includes a sense circuit 302 (e.g., voltage sense circuit) for detecting power loss at the input pin 141. The sense circuit 302 may control the third terminal (e.g., gate) of each the transistors M3 and M4 to keep them ON (i.e., closed) during normal operation or to turn them OFF (i.e., open) in the event of a power loss. The disconnect circuit 221 may be in accordance with the E-Fuse™ technology of Monolithic Power Systems, Inc., for example.

As can be appreciated the disconnect circuit 221 may also be implemented with a single transistor and/or with a separate sense circuit without detracting from the merits of the present invention. For example, the sense circuit 302 may provide a sense signal to the controller 112 (shown in FIG. 1) to indicate the condition of the input voltage VIN at the input pin 141. The input pin 141 may be connected to the output pin 143 by way of a single transistor. The controller 112 may keep the transistor ON during normal operation and turn the transistor OFF in the event of power loss. Other sensing and disconnect configurations may also be employed without detracting from the merits of the present invention.

In the example of FIG. 3, the bidirectional buck-boost converter 113 includes transistors M1 and M2, which in one embodiment are MOSFETs. A first terminal (e.g., source) of the transistor M1 is connected to a second terminal (e.g., drain) of the transistor M2 to form a switch node SW. A second terminal (e.g., drain) of the transistor M1 is connected to the storage node 204, and a first terminal (e.g., source) of the transistor M2 is connected to ground. The switch node SW is connected to the output pin 143 by way of an inductor L1. The third terminals (e.g., gates) of the transistors M1 and M2 are controlled by the controller 112 (shown in FIG. 1) to operate the transistors M1 and M2 to perform boost conversion during normal operation and to perform buck conversion during power loss. A decoupling capacitor C4 connects the storage node 204 to ground.

In the example of FIG. 3, the storage capacitors C1 of a set of storage capacitors C1 are connected in parallel. Each storage capacitor C1 has a first end that is connected to the storage node 204 by way of a blocking circuit 220 and a second end that is connected to ground. A blocking circuit 220 connects a set of storage capacitors C1 to the PMIC 110. In the example of FIG. 3, a blocking circuit 220 is connected in series between a storage pin 142 and the storage node 204.

In the example of FIG. 3, a blocking circuit 220 includes a transistor M5 (e.g., MOSFET) and a sense circuit 301. The transistor M5 has a first terminal (e.g., source) that is connected to a storage pin 142 and a second terminal (e.g., drain) that is connected to the storage node 204. The sense circuit 301 is configured to detect overcurrent (i.e., excessive, damaging current) through the transistor M5. The sense circuit 301 may be implemented using a sense transistor across the transistor M5 in a dual transistor sensing configuration. The sense circuit 301 may include a comparator that compares the sense current to a threshold to detect overcurrent. As can be appreciated, the sense circuit 301 may also be implemented using a sense resistor in series with the transistor M5 or other sensing configuration. A failed set of storage capacitors C1 may also be detected using other detection schemes without detracting from the merits of the present invention.

The sense circuit 301 may be configured to control the third terminal (e.g., gate) of the transistor M5 to turn the transistor M5 ON or OFF. The sense circuit 301 turns OFF the transistor M5 to disconnect the set of storage capacitors C1 from the storage node 204 in response to detection of overcurrent through the transistor M5; the sense circuit 301 otherwise keeps the transistor M5 ON. In other embodiments, the sense circuit 301 sends a sense signal to the controller 112, which controls the third terminal of the transistor M5 to turn the transistor M5 OFF when the sense signal indicates overcurrent; the controller 112 otherwise keeps the transistor M5 ON. Turning OFF the transistor M5 disconnects the corresponding set of storage capacitors C1 from the bidirectional buck-boost converter 113 and from the other set of storage capacitors C1.

Figure 4:
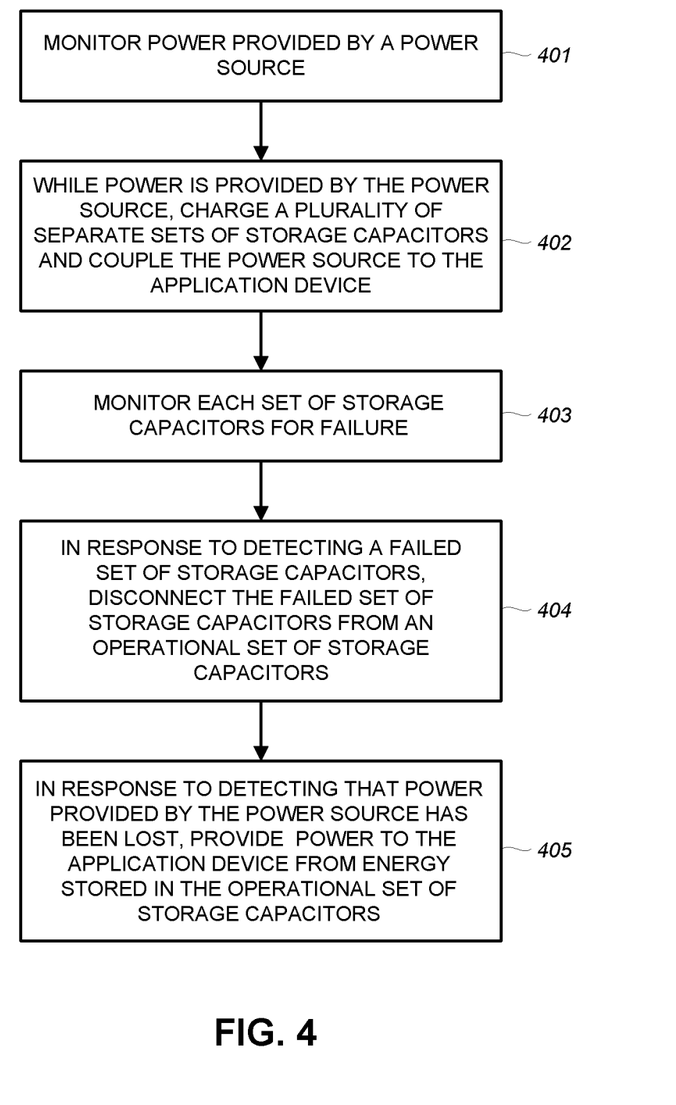
FIG. 4 shows a flow diagram of a method of providing power loss protection to an application device in accordance with an embodiment of the present invention.

FIG. 4 shows a flow diagram of a method of providing power loss protection to an application device in accordance with an embodiment of the present invention. The method of FIG. 4 may be performed by the PMIC 110, for example.

In step 401, power provided by a power source is monitored at an input pin of a PMIC. In step 402, while power is being provided by the power source, the power source is connected to an application device and a plurality of sets of storage capacitors are charged using power from the power source. In one embodiment, a bidirectional buck-boost converter operates in boost mode to boost an input voltage from the power source to a higher voltage that is used to charge the sets of storage capacitors.

In step 403, each set of storage capacitors is monitored for failure. In one embodiment, current through a line connecting a set of storage capacitors to the PMIC is monitored for overcurrent, i.e. excessive current that can damage the PMIC, other sets of storage capacitors, or other circuits. Overcurrent from a set of storage capacitors indicates a failed set of storage capacitors.

In step 404, in response to detecting a failed set of storage capacitors, the failed set of storage capacitors is disconnected from an operational set of storage capacitors and from the PMIC. The operational set of storage capacitors remains connected to the PMIC.

In step 405, in response to detecting that power from the power source has been lost, the power source is disconnected from the PMIC. In that case, power to the application device is provided from energy stored in the operational set of storage capacitors.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. An integrated circuit (IC) chip for providing power loss protection, the IC chip comprising:
    an input pin that is connected to receive an input voltage from a power source;
    an output pin that is connected to provide a bus voltage to an application device;
    a plurality of storage pins, each of a plurality of sets of storage capacitors being connected to a separate storage pin of the plurality of storage pins;
    a disconnect circuit that connects the power source to the application device
    during a normal operation when the power source provides the input voltage, and that disconnects the power source from the application device in an event of power loss when the power source no longer provides the input voltage, wherein the disconnect circuit comprises a first transistor having a first terminal that is connected to the input pin and a second terminal that is connected to the output pin;
    a converter circuit that charges the plurality of sets of storage capacitors with the bus voltage during the normal operation and that provides the bus voltage to the application device from energy stored in at least one operational set of storage capacitors of the plurality of sets of storage capacitors from a first node of the converter circuit to a second node of the converter circuit in the event of power loss, wherein the first node of the converter circuit is connected to the plurality of sets of storage capacitors and the second node of the converter circuit is connected to the output pin; and
    a plurality of blocking circuits, wherein each blocking circuit of the plurality of blocking circuits connects a corresponding set of storage capacitors of the plurality of sets of storage capacitors to the first node of the converter circuit while the corresponding set of storage capacitors remains operational and disconnects the corresponding set of storage capacitors from the first node of the converter circuit in an event of a failure of the corresponding set of storage capacitors.

2. The IC chip of claim 1, wherein the converter circuit comprises:
    a second transistor having a first terminal that is the first node of the converter circuit and a second terminal that is the second node of the converter circuit; and
    a third transistor having a first terminal that is connected to ground and a second terminal that is connected to the second terminal of the second transistor.

3. The IC chip of claim 2, further comprising an inductor that connects the second terminal of the second transistor to the output pin.

4. The IC chip of claim 1, wherein the disconnect circuit further comprises a fourth transistor having a first terminal that is connected to the output pin and a second terminal that is connected to the second terminal of the first transistor.

5. The IC chip of claim 1, wherein each of the plurality of blocking circuits comprises a fifth transistor having a first terminal that is connected to a set of storage capacitors of the plurality of sets of storage capacitors and a second terminal that is connected to the first node of the converter circuit.

6. The IC chip of claim 1, wherein each of the plurality of sets of storage capacitors comprises capacitors that are connected in parallel.

7. The IC chip of claim 1, wherein the converter circuit boosts the input voltage to a higher voltage that is used to charge the plurality of sets of storage capacitors during the normal operation, and wherein the higher voltage level is at the first node of the converter circuit during the normal operation.

8. The IC chip of claim 7, wherein the converter circuit bucks a voltage from the at least one operational set of storage capacitors to a lower voltage that is provided as the bus voltage to the application device during the event of power loss, wherein the lower voltage level is at the second node of the converter circuit during the event of power loss.

9. The IC chip of claim 1, wherein the output pin is connected to a DC-DC converter circuit of the application device.

10. A method of providing power loss protection to an application device, the method comprising:
monitoring an input voltage provided by a power source;
while the power source is providing the input voltage, coupling the power source to an application device, boosting the input voltage provided by the power source to a higher level to generate a boosted voltage at a node, and charging a plurality of sets of storage capacitors using the boosted voltage;
monitoring each of the plurality of sets of storage capacitors;
in response to detecting a failed set of storage capacitors of the plurality of sets of storage capacitors, disconnecting the failed set of storage capacitors from an operational set of storage capacitors of the plurality of sets of storage capacitors, wherein each of the plurality of sets of storage capacitors is connected to the node by a corresponding switch and the failed set of storage capacitors is disconnected from the operational set of storage capacitors by opening a switch that connects the failed set of storage capacitors to the node; and
in response to detecting loss of the input voltage provided by the power source, bucking a voltage provided by at least the operational set of storage capacitors to a lower level to generate a bus voltage and providing the bus voltage to the application device.

11. The method of claim 10, wherein coupling the power source to the application device while the power source is providing the input voltage comprises:
providing the input voltage from the power source to a DC-DC converter of the application device.

12. A power loss protection circuit comprising:
a converter circuit that is configured to charge a first set of storage capacitors and a second set of storage capacitors with a bus voltage from a first node of the converter circuit to a second node of the converter circuit during a normal operation when a power source provides an input voltage to the first node of the converter circuit, and to provide the bus voltage to an application device from energy stored in at least one of the first and second sets of storage capacitors from the second node of the converter circuit to the first node of the converter circuit during a power loss event when the power source stops providing the input voltage;
a first blocking circuit that is configured to connect the first set of storage capacitors to the second node of the converter circuit while the first set of storage capacitors remains operational and to disconnect the first set of storage capacitors from the second node of the converter circuit when the first set of storage capacitors suffers a failure;
a second blocking circuit that is configured to connect the second set of storage capacitors to the second node of the converter circuit while the second set of storage capacitors is operational and to disconnect the second set of storage capacitors from the second node of the converter circuit when the second set of storage capacitors suffers a failure; and
a disconnect circuit that is configured to disconnect the power source from the first node of the converter circuit during the power loss event and to connect the input voltage to the first node of the converter circuit and to the application device during the normal operation.

13. The circuit of claim 12, wherein the converter circuit comprises:
a first transistor having a first terminal that is the second node of the converter circuit and a second terminal that is the first node of the converter circuit; and
a second transistor having a first terminal that is connected to the second terminal of the first transistor and a second terminal that is connected to ground.

14. The circuit of claim 13, further comprising:
an inductor having a first end that is connected to the second terminal of the first transistor and a second end that is connected to a node where the bus voltage is provided to the application device.

15. The circuit of claim 14, wherein the bus voltage is provided to a DC-DC converter circuit of the application device.

16. The circuit of claim 15, wherein the application device has a nonvolatile memory.

* * * * *